United States Patent [19]

Bennett et al.

[11] 3,726,944

[45] Apr. 10, 1973

[54] RESILIENT MATERIAL OF PARTICULATE RUBBER IN A BINDER OF BUTADIENE AND COUMARONL INDENE POLYMERS

[75] Inventors: Richard J. Bennett; Duane W. Gagle, both of Bartlesville, Okla.

[73] Assignee: Phillips Petroleum Company, Bartlesville, Okla.

[22] Filed: Mar. 10, 1971

[21] Appl. No.: 123,049

[52] U.S. Cl............260/829, 260/2.3, 260/27 BB, 260/41.5 A, 260/41.5 R, 260/846, 260/887, 260/890

[51] Int. Cl. ............................................C08f 39/00

[58] Field of Search......................................260/829

[56] References Cited

UNITED STATES PATENTS

| | | | |
|---|---|---|---|
| 3,562,356 | 2/1971 | Nyberg | 260/876 |
| 3,440,304 | 4/1969 | Hall | 260/829 |
| 3,352,944 | 11/1967 | Wheat | 260/829 |
| 2,884,400 | 4/1959 | Moore | 260/829 |
| 3,549,574 | 12/1970 | Hawkins | 260/829 |
| 3,625,752 | 12/1971 | Korpman | 260/829 |
| 3,630,980 | 12/1971 | Russell | 260/829 |
| 3,635,861 | 1/1972 | Russell | 260/829 |
| 3,686,107 | 8/1972 | Russell | 260/829 |

FOREIGN PATENTS OR APPLICATIONS

| | | | |
|---|---|---|---|
| 906,225 | 9/1962 | Great Britain | 260/829 |

*Primary Examiner*—Paul Lieberman
*Attorney*—Young & Quigg

[57] ABSTRACT

An article of manufacture and a process for producing same is provided. The article is comprised of discrete particulate matter bound into a solid resilient mass by a binder material comprised of a butadiene-styrene copolymer and a tackifying resin.

9 Claims, No Drawings

RESILIENT MATERIAL OF PARTICULATE RUBBER IN A BINDER OF BUTADIENE AND COUMARONL INDENE POLYMERS

This invention relates to a resilient article of manufacture comprised of particulate matter, such as rubber particles, and a binder material, such as a high green strength butadiene-styrene copolymer and to a process for producing same.

It is desirable to utilize waste materials or potential waste materials and products in useful articles and processes. Such use of waste or salvage materials, when possible, cuts off a source of pollution at its source, and is accordingly of a beneficial economic nature, and promotive of an improved environmental life style.

It is thus the object of this invention to provide a useful resilient article of manufacture and a process for producing same, whereby the principal ingredient of the article is particulate matter which would otherwise be a waste material.

Other objects, aspects, and the many advantages of this invention will be apparent to one skilled in the art from a study of following specification and appended claims.

In accordance with this invention, there is provided an article of manufacture comprised of discrete particulate matter in combination with a binder material comprised of a high green strength butadiene-styrene copolymer and a resinous tackifier. The article is a dry solid material having a spongy, matted appearance which is caused by the fact that the discrete particulate matter is bound together by the binder material in a nonuniform, irregular pattern. The article has a rough texture; it is quite resilient and immediately reassumes its shape upon release of applied pressure.

The resilient article can be formed in place as a covering for large unbroken areas; it is useful as a resilient mortar; and it is useful as a premolded article. Thus the resilient material of this invention is useful as a covering for floors and outdoor surfaces such as athletic tracks and fields, horse-race tracks, playgrounds, and the like. In addition, the resilient material of this invention is useful in premolded items such as athletic padding, upholstery and furniture padding, shock or impact padding and paneling in vehicles, and similar applications. Also, the material has use as an undercoating and sound deadening agent, and as an antiskid surface for pavements and bridges as well as for stair treads, ramps, and similar skid and slip hazard areas. The material also has use in abrasion resistance applications and as a sealant, a caulking compound, a joint filler, and as a mortar in those applications where a resilient bond is required.

The resilient material develops good strength without need for vulcanization or chemical curing. That is, upon completion of its manufacture, as hereinafter described, it is immediately available for use without further treatment being required.

The weight ratio of particulate matter to binder material present in the resilient article of this invention is in the range of 100 parts by weight particulate matter per 6 to 60, preferably 15 to 40, parts by weight binder material wherein the weight ratio of copolymer to tackifier in the binder material is in the range of 1:1 to 4:1, preferably 2:1 to 3:1, parts by weight copolymer per part by weight tackifier. The presently preferred embodiment contains 33 parts by weight binder material per 100 parts by weight particulate matter wherein the ratio of copolymer to tackifier is 2 to 1 such that the weight ratio of particulate matter to copolymer to tackifier is 100 to 22 to 11.

The particulate matter useful herein comprises a diverse selection of waste or salvage aggregate material such as tire buffings, i.e., that material removed, scraped, or abraded from vehicle tires during balancing, rubber chips, such as from old useless tires, vulcanized rubber chips, synthetic resins, metal turnings, wire, gravel and small rocks, glass, seed bulbs, wood chips, sawdust, vegetable fibers, sand, ceramics, and similar waste materials and mixtures thereof.

The high green strength butadiene-styrene copolymer, i.e., the copolymer, constitutent of the binder material is one of a branched block copolymer and a linear block copolymer both as hereinafter defined.

The branched block copolymer is comprised of conjugated dienes and monovinyl substituted aromatic compounds and has at least three relatively long block copolymer branches which radiate from a nucleus. The terminal polymer block segments on each of the branches are composed of the monovinyl-substituted aromatic compound. Therefore, the term "branched block copolymer" as used herein is intended to mean copolymers having the general formula $$Z(-CD)_n$$

wherein each D group is a terminal block segment comprising essentially vinyl aromatic units, each C group is a connecting polymer block segment comprising essentially conjugated diene units, the Z group is derived from a polyfunctional compound having at least three reactive sites, and n is not less than three.

The branched block copolymer, as herein defined, must have at least three block copolymer branches radiating from a nucleus. Each of the block copolymers in each branch has at least two polymer block segments made from conjugated dienes and vinyl aromatic compounds.

The relative amounts of the vinyl-substituted aromatic compound and the conjugated diene used in producing the branched block copolymers described above can vary over a wide range. The amount of conjugated diene present in the branched block copolymer can be present in the range from 40 to 95 parts by weight per 100 parts by weight of the branched block copolymer. The vinyl-substituted aromatic compound can be present in the range of from 5–60 parts by weight per 100 parts by weight of the branched block copolymer. Preferably, the conjugated diene will be present in an amount of from 50 to 90 parts by weight per 100 parts by weight of the branched block copolymer.

The amount of vinyl-substituted aromatic compound that is present as terminal polymer block segments in the branched block copolymers used in this invention can vary over a wide range. It is desirable that the terminal polymer block segments comprise the vinyl-substituted aromatic compound to the extent of at least 5 percent by weight of the branched block copolymer.

The vinyl-substituted aromatic compound can be polymerized for a period of time to produce a polymer block segment of the vinyl-substituted aromatic compound of sufficient size followed by a second polymerization step wherein the conjugated diene is polymerized. In some instances it may be desirable to allow all of the vinyl-substituted aromatic compound to be polymerized before adding the conjugated diene for the second polymerization step. In other instances, any unreacted vinyl-substituted aromatic compound can be removed from the polymerization mixture followed by the addition of the conjugated diene for the second polymerization step. And in still other instances, any unreacted vinyl-substituted aromatic compound may be left in the polymerization system and the conjugated diene can be added for the second polymerization step. In the latter instance, the polymer block segments formed in the second polymerization step may contain both conjugated diene monomer units and vinyl-substituted aromatic monomer units.

It is preferable that the terminal polymer block segments on the branched block copolymer be homopolymer blocks of the vinyl-substituted aromatic compound. However, it is also within the scope of this invention to utilize branched block copolymers with terminal polymer block segments that are predominantly vinyl-substituted aromatic polymers with minor amounts of the conjugated diene monomer units. When the terminal polymer blocks are composed of both vinyl-substituted aromatic units and conjugated diene units, the conjugated diene comprises less than 20 parts by weight for each 100 parts by weight of the terminal polymer block, with the vinyl-substituted aromatic comprising the remainder.

The vinyl-substituted aromatic compounds that can be used in producing branched block copolymers for use in the adhesive composition of this invention can have up to about 24 carbon atoms per molecule and include: styrene, 1-vinylnaphthalene, 2-vinylnaphthalene and the alkyl, cycloalkyl, aryl, alkaryl, and aralkyl derivatives thereof. Examples of such substituted monomers include: α-methylstyrene, 3-methylstyrene, 4-n-propylstyrene, 4-cyclohexylstyrene, 3-phenylstyrene, 4-dodecylstyrene, 2-ethyl-4-benzylstyrene, 4-p-tolyl-styrene, 4-(4-phenyl-n-butyl)styrene, 3,6-di-n-hexyl-1-vinylnaphthalene, and the like.

The conjugated dienes used in the production of branched block copolymers for incorporation in the adhesive recipes of this invention are those which contain from four to 12 carbon atoms per molecule. The conjugated dienes containing from four to eight carbon atoms are preferred. Examples of such compounds include 1,3-butadiene, isoprene, 2,3-dimethyl-1,3-butadiene, piperylene, 1,3-octadiene, 3-butyl-1,3-octadiene, 1-phenyl-1,3-butadiene and the like.

The above referred to "Z" group which forms the nucleus from which the polymer blocks of the branched block copolymer radiate is derived from a polyfunctional compound having at least three reactive sites capable of reacting with a carbon-lithium bond. Types of polyfunctional compounds which can be used include the polyepoxides, polyisocyanates, polyimines, polyaldehydes, polyketones, polyanhydrides, polyesters, polyhalides and the like. As will be hereafter described, the polymer block segments are polymerized in the presence of an organomonolithium initiator. It is preferred that the amount of polyfunctional compound utilized be 1.0 equivalent per equivalent of carbon-lithium in the polymer for maximum branching. Reference to U. S. Pat. No. 3,281,383 will reveal further details of the polyfunctional compound useful in the formation of the branch block copolymers.

The branched block copolymers can be formed by any method known in the art, such as the method set out in U. S. Pat. No. 3,281,383. Briefly, this method of forming the branched block copolymers is as follows. The vinyl-substituted aromatic compound is polymerized first in the presence of an organomonolithium initiator. After the vinyl-substituted aromatic compound has been polymerized to form the initial polymer block, the conjugated diene can be added to the polymerization mixture to produce a block copolymer of the conjugated diene and the vinyl-substituted aromatic compound. By the procedure of polymerizing the vinyl-substituted aromatic compound first, followed by the addition of the conjugated diene compound, a block copolymer having a terminal lithium atom is formed. The lithium atom will be at the end of the conjugated diene polymer block. The lithium-terminated block copolymer is called a "living polymer" because of the presence of the lithium atom at the end of the conjugated diene polymer block. The living polymer can then be conveniently reacted with a polyfunctional compound having at least three reactive sites that are capable of reacting with the carbon-lithium bond of the living polymer. By regulating the amounts of the living polymer and the amounts of the polyfunctional compound, it is possible to produce a branched block copolymer having at least three relatively long polymer branches extending outwardly from the nucleus. The nucleus or hub is formed by the polyfunctional compound which reacted with the lithium-terminated polymer. In order to produce the branched block copolymers having at least three polymer branches, it is essential that the polyfunctional compound have at least three reactive sites that are capable of reacting with the carbon-lithium bond of the living polymer.

To achieve maximum branching the optimum amount of polyfunctional compound that is reacted with the living polymer will be an amount of polyfunctional compound that contains one equivalent of treating agent for each living polymer molecule. In other words, each reactive site on the polyfunctional compound will react with a carbon-lithium bond in the living polymer. Larger amounts of the polyfunctional compound encourage the production of polymers that are coupled in a linear configuration instead of being branched. When equivalent amounts of the polyfunctional compound and the living polymer are reacted, the final product comprises a branched polymer in which the polymer chain is joined at one end to each reactive site of the treating agent.

Since the branched block copolymers used in this invention preferably contain terminal homopolymer blocks of the vinyl-substituted aromatic compound, it is necessary that the vinyl-substituted aromatic compound be polymerized first when an organomonolithium initiator is used to form the block copolymer. After the vinyl-substituted aromatic compound has been polymerized to the desired length, any unreacted vinyl-substituted aromatic compound can be removed. The conjugated diene is then added to the polymerization mixture and the polymerization is continued until the conjugated diene has been polymerized to the desired amount. The living polymer of the vinyl-substituted aromatic compound and the conjugated diene thus formed can then be reacted with the polyfunctional compound to produce the branched block copolymer. In some instances, it may be desirable to form other polymer blocks before the living polymer is reacted with the polyfunctional compound. This is very easily accomplished by simply adding additional monomer increments to produce additional polymer blocks before the living polymer is reacted with the polyfunctional compound. Thus, it is possible to produce block copolymers having 2,3, or more separate and distinct polymer blocks by the above procedure.

The term "linear block copolymer" is intended to mean copolymers having the general formula

ABA wherein each A group is a block segment comprising a homopolymer of a vinyl-substituted aromatic hydrocarbon, and each B group is a block segment comprising a copolymer of a conjugated diene and a vinyl-substituted aromatic hydrocarbon.

The linear block copolymers of this invention contain three polymer block segments made from conjugated dienes having four to about 12 carbon atoms per molecule and vinyl-substituted aromatic hydrocarbons having no more than about 24 carbon atoms per molecule. The three block segments are joined together end to end such that there is a central copolymer block segment of the conjugated diene and the vinyl aromatic hydrocarbon and two end or terminal essentially homopolymer block segments of the vinyl aromatic hydrocarbon. At least 45 weight percent of the total vinyl aromatic compound in the linear block copolymer should be in the terminal homopolymer blocks.

The preferred conjugated dienes which are used to prepare the linear block copolymers of this invention include 1,3-butadiene, isoprene, and piperylene. Other conjugated dienes which can be used include 2,3-dimethyl-1,3-butadiene, 1,3-octadiene, 3-butyl-1,3-octadiene, 1-phenyl-1,3-butadiene, and the like. The vinyl-substituted aromatic hydrocarbons which can be employed include styrene, 1-vinylnaphthalene, 2-vinylnaphthalene, and alkyl, cycloalkyl, aryl, alkaryl and aralkyl derivatives thereof such as α-methylstyrene, 3-methylstyrene, 4-n-propylstyrene, 4-cyclopentylstyrene, 3-phenylstyrene, 2-ethyl-4-benzylstyrene, 4-p-tolylstyrene, and 3-dodecyl-1-vinylnaphthalene.

The linear block copolymers of this invention can be prepared by any method known in the art such as by the method described in U. S. Pat. No. 3,287,333.

The resinous tackifier which is useful in this invention can be any of the resinous substances known in the art for enhancing the tack of adhesive compositions. Examples of some suitable tackifiers include rosin; dehydrogenated rosin, rosin plus polyterpene resins, e.g., polymerized beta-pinene (from 100 percent rosin to 100 percent resin); hydrogenated rosin esters of glycerol; hydrogenated rosin esters of pentaerythritol; coumarone-indene resins; hydrogenated rosin; esters of polymerized rosin and glycerol; maleic anhydride-modified rosin and rosin derivatives; partial esters of styrene-maleic acid copolymers; chlorinated biphenyls; oil-soluble phenol-aldehyde resins; and the like.

The surface of the particulate matter must be contacted with the binder material in order to produce a satisfactorily bound product. In fact, the better the contact established between the entire surface of the particulate matter and the binder material the better and more cohesive will be the solid, resilient article of this invention. Best results are obtained when all the surfaces of the particulate matter are completely contacted with the binder material. Accordingly, to establish the desired contact the particulate matter can be contacted with a solution or dispersion of the binder material. In one technique the loose, unbound particulate matter can first be placed in a mold or otherwise arranged in the shape, size, thickness, and configuration desired of the finished solid article. The solution or dispersion of binder material can then be poured, sprayed, or otherwise applied to the preplaced arrangement of particulate matter. Upon evaporation of the solvent or dispersant the resilient article is complete and ready for use.

The quantity of solvent or dispersant utilized is sufficient to conveniently enable the complete contact of the entire surface of the particulate matter with the desired quantity of binder material. Although the actual quantity of solvent or dispersant is not of particular critical importance, a convenient quantity is in the range of about 1 to 5 parts by weight solvent per one part by weight binder material. In the preferred embodiment the weight ratio of solvent to binder material is approximately 41 parts by weight solvent per 33 parts by weight binder material.

The solvents or dispersants useful herein reduce the viscosity of the binder material and serve to wet the surface of the particulate matter. Although any organic solvent which is inert toward the other components of the mixture can be used, the preferred solvents are saturated aliphatic, saturated cycloaliphatic, and aromatic hydrocarbons, e.g., pentane, 2-methylpentane, hexane, 3-ethylhexane, heptane, octane, nonane, naphtha, cyclopentane, methylcyclopentane, cyclohexane, methylcyclohexane, benzene, toluene, xylene, and the like. Other liquid organic solvents can be used, e.g., halogenated hydrocarbons such as trichloroethylene, ethers, ketones, esters, and the like. Mixtures of the above solvents are also useful, with the presently preferred embodiment having a solvent mixture consisting of trichloroethylene and xylene wherein the trichloroethylene is present to the extent of about 60 percent by weight of the solvent mixture.

Particularly satisfactory results can be obtained by applying the binder material to the particulate matter in the form of an emulsion comprising the binder material, the solvent/dispersant, water, and a suitable quantity of a cationic surfactant wherein the quantity of water utilized in the emulsion is in the range of 20 to 65 percent by weight of the emulsion.

The emulsion can also contain other ingredients such as fillers, pigments, stabilizers, antiozonants and the like.

EXAMPLE

In five experimental runs, five resilient articles were made as follows: Tire buffings larger than No. 10 Tyler sieve mesh were combined with an emulsion of the binder material in a suitably large container. The buffings and emulsion were thoroughly stirred until a uniformly thorough mixture was obtained. When the buffings-emulsion mixtures were thoroughly mixed, a portion of each mixture was transferred to a separate circular metal form, each being about 6 inches in diameter and about ½-inch deep. Each mixture was compacted into its form with a roller and excess liquid was poured off. Each compacted mixture was then allowed to stand for 24 hours at room temperature (approximately 75°F.) during which time the fluid evaporated to thus produce the above-referred-to five finished resilient articles of this invntion. The recipe for each run is set out in Table I below:

TABLE I

| Run number | Tire buffings grams | Binder material | | Solvent | | | Surfactant,[3] grams | Produced articles comparison of particle bonding |
|---|---|---|---|---|---|---|---|---|
| | | Copolymer,[1] grams | Resin,[2] grams | Trichloro-ethylene, grams | Xylene, grams | Water, grams | | |
| 1 | 100 | 6.6 | 3.3 | 7.44 | 4.98 | 6.705 | 0.795 | 5 |
| 2 | 100 | 11 | 5.5 | 12.4 | 8.3 | 11.175 | 1.325 | 3 |
| 3 | 100 | 22 | 11 | 24.8 | 16.6 | 22.35 | 2.65 | 1 |
| 4 | 100 | 5.5 | 2.75 | 6.2 | 4.15 | 30.5875 | 0.6625 | 4 |
| 5 | 100 | 11 | 5.5 | 12.4 | 8.3 | 61.175 | 1.325 | 2 |

NOTES:
1. A commercially available branched block copolymer.
2. A coumarone-indene resin.
3. A commercially available cationic surfactant.

The article produced in Run 3 exhibited the best particle bonding of the five articles made in the five runs. The article 3 was bonded to, and removable from, the metal form and had excellent bonding between and around the particulate tire buffings. Article 5 was about the same as article 3 with respect to particle bonding, and article 2 was also bonded to, but removable from, the metal form and had good particle bonding. In summation, the best particle bonding results were obtained with article 3 with particle bonding results descending therefrom as follows; articles 5, 2, 4, and 1. Article 1 could be picked up as a cohesive unit, but there was very little bonding between particles.

It is noted that the quantity of water utilized had a beneficial effect upon the quality of the particle bonding. Thus, whereas the binder material and other emulsion ingredients were reduced by 50 percent as between runs 3 and 5 except that there was an increase in water content of about 2.7 to 1 the produced articles 3 and 5 were about the same with respect to particle bonding. Comparison of run 5 with run 2 and run 4 with run 1 similarly shows that increasing water content of the emulsion produced better resilient articles where the other emulsion ingredients are or are about the same.

Reasonable variations and modifications of this invention can be made, or followed, in view of the foregoing disclosure, without departing from the spirit or scope thereof.

Having described our invention that which is claimed is:

1. A resilient article of manufacture comprised of a cured particulate rubber in combination with a binder material comprised of an uncured high green strength butadiene-styrene copolymer and a coumarone-indene resinous tackifier wherein the weight ratio of said particulate rubber to said binder material is in the range of 100 parts by weight particulate rubber per 6 to 60 parts by weight binder material wherein the weight ratio of said copolymer to said tackifier is in the range of 1:1 to 4:1.

2. The article of claim 1 wherein said copolymer is one of a branched block copolymer and a linear block copolymer wherein: said branched block copolymer is comprised of at least three block copolymer branches radiating from a nucleus, each of said block copolymer branches having at least two polymer block segments made from conjugated dienes which comprise 40 to 95 percent by weight of said branched block copolymer and vinyl aromatic compounds which comprise 5 to 60 percent by weight of said branched block copolymer; and wherein said linear block copolymer is comprised of a first block segment, a second block segment, and a third block segment wherein said second block segment, a copolymer of a conjugated diene having four to 12 carbon atoms per molecule and a vinyl-substituted aromatic compound having no more than 24 carbon atoms per molecule, is sandwiched between said first and said third block segments both of which are homopolymer blocks of said vinyl-substituted aromatic compound.

3. The article of claim 2 wherein said copolymer is said branched block copolymer.

4. The resilient material of claim 1 wherein said particulate rubber consists of tire buffings.

5. A process for the preparation of a resilient article comprised of a cured particulate rubber and a binder material comprised of an uncured high green strength butadiene-styrene copolymer and a coumarone-indene resinous tackifier, said process comprising contacting said particulate rubber with said binder material in a sufficient quantity of an organic solvent to thus form a mixture, forming said mixture into a configuration desired of said article when complete, and permitting said solvent to evaporate from said formed mixture to thus produce the completed, dry, solid, resilient article wherein the weight ratio of said particulate rubber to said binder material is in the range of 100 parts by weight particulate rubber per 6 to 60 parts by weight binder material wherein the weight ratio of said copolymer to said tackifier is in the range of 1:1 to 4:1, and further wherein said copolymer is one of a branched block copolymer and a linear block copolymer wherein: said branched block copolymer is comprised of at least three block copolymer branches radiating from a nucleus, each of said block copolymer branches having at least two polymer block segments made from conjugated dienes which comprise 40 to 95 percent by weight of said branched block copolymer and vinyl aromatic compounds which comprise 5 to 60 percent by weight of said branched block copolymer; and wherein said linear block copolymer is comprised of a first block segment, a second block segment, and a third block segment wherein said second block segment, a copolymer of a conjugated diene having four to 12 carbon atoms per molecule and a vinyl-substituted aromatic compound having no more than 24 carbon atoms per molecule, is sandwiched between said first and said third block segments both of which are homopolymer blocks of said vinyl-substituted aromatic compound.

6. The process of claim 5 wherein the weight ratio of said solvent to said binder material is in the range of 1 to 5 parts by weight solvent per one part by weight of said binder material.

7. The process of claim 6 wherein said binder material is contained in an emulsion, said emulsion being comprised of said binder material, said organic solvent, water and a suitable surfactant wherein said water in said emulsion is present in the range of 20 to 65 percent by weight of the total weight of said emulsion, and during said evaporation step said water evaporates as well as said solvent.

8. The process of claim 7 wherein said solvent is a mixture of trichloroethylene and xylene wherein said trichloroethylene is present in said solvent mixture to the extent of about 60 percent by weight of the total weight of said solvent mixture.

9. A process according to claim 5 wherein said particulate rubber consists of tire buffings.

* * * * *